Nov. 17, 1970  H. F. A. TSCHUNKO  3,540,802
OPTICAL MIRROR APPARATUS
Filed March 11, 1968  2 Sheets-Sheet 1

INVENTOR:
HUBERT F. A. TSCHUNKO,
BY
ATTORNEYS

Nov. 17, 1970     H. F. A. TSCHUNKO     3,540,802
OPTICAL MIRROR APPARATUS

Filed March 11, 1968     2 Sheets-Sheet 2

INVENTOR:
HUBERT F. A. TSCHUNKO,
BY
ATTORNEYS

United States Patent Office 3,540,802
Patented Nov. 17, 1970

3,540,802
OPTICAL MIRROR APPARATUS
Hubert F. A. Tschunko, Milton, Mass., assignor to the United States of America as represented by the Administrator of the National Aeronautics and Space Administration
Filed Mar. 11, 1968, Ser. No. 712,099
Int. Cl. G02b 5/08
U.S. Cl. 350—310
8 Claims

ABSTRACT OF THE DISCLOSURE

An optical mirror for reflecting light and including an integral support cage formed by a plurality of cylindrical supports which contact the rear surface of the mirror along continuous paths concentric with the mirror's optical axis is disclosed. The support cage provides physical stability and minimizes harmful image distortion by producing a surface deformation pattern which qualitatively matches an expected light diffraction pattern of the created images.

---

The invention described herein was made by an employee of the United States Government and may be manufactured and used by or for the Government for governmental purposes without the payment of any royalties thereon or therefor.

This invention relates generally to optical mirrors and more particularly relates to an optical mirror for producing reflected images of light diffraction patterns.

There exist many applications requiring the improvements of the image elements in an optical system. In systems such as an optical plane mirror for deflecting a light beam; an optical imaging mirror system for receiving radiation from a distant target to produce images of said targets; an optical imaging system for transmitting radiation to a distant target, the receiver; all such optical systems have to direct light beams as precise as possible, and have to avoid additional aberrations of the light beam. Such impairments are produced by deflections of the reflecting mirror surfaces, which deflections in turn are caused by imperfect support systems of the mirror.

The quality of these optical systems becomes obvious in the light distribution within the image of a point-like light source, within an image element. All images are composed of image elements. Those image elements represent patterns caused by diffraction effects, by the wave nature of the light radiation. Imperfections and mirror deflections distort these patterns. This problem is particularly acute in the field of astronomical telescopes which utilize relatively thin, large diameter, reflection mirrors. With mirrors of this type, deflection of the reflective surface is produced by the mirror supports themselves thereby introducing distortion into the reflected image. Although various types of mirror support systems have been developed in an attempt to alleviate this problem, no such system has been totally satisfactory and the problem of image distortion persists.

Previous mirror support systems have included, for example, hexagonal and rectangular arrangements of support points or support regions. One such arrangement of support points is described in the book entitled, "Telescopes" edited by Gerard Kuiper et al., published by the University of Chicago Press, 1960. A rectangular arrangement of support points has been described in the book entitled, "Amateur Telescope Making," Book One edited by A. G. Ingalls, published by Scientific Incorporated, 1966. However, these prior art support systems cause a hexagonal and rectangular deterioration, respectively, of the diffraction image, degrading the imaging quality.

The applicant's co-pending U.S. application Ser. No. 712,100, filed concurrently herewith and entitled "Optical Mirror Support System" describes a unique mirror support system which substantially reduces harmful image distortion by exploiting the inherent and predictable symmetry existing in light diffraction patterns. According to that invention, a multi-element mirror support system produces a predetermined deformation pattern on the reflective mirror surface. By qualitatively matching this deformation pattern with the expected light diffraction pattern, harmful distortion is reduced and image quality significantly improved. However, the support structure described in the above application is not suitable for all applications. For example, optical systems used in moving vehicles such as land craft, aircraft, rockets, etc. are subjected to relatively severe mechanical and thermal shock. For this reason, the mirrors in such systems must possess a degree of physical stability not easily obtained with a plurality of basically insular support elements.

The object of this invention, therefore, is to provide a highly stable optical mirror assembly which optimizes the image quality of light diffraction patterns.

One feature of this invention is the provision of an optical mirror having a front plate with a reflective surface and an opposing support surface mounted on a support cage including a spaced back plate and a plurality of connecting annular support elements. The support elements engage the mirror's support surface along a plurality of spaced apart contact paths which form substantially concentric closed plane curves. The continuous contact paths produce on the reflective mirror surface symmetrical deformation patterns which resemble the light diffraction patterns produced by optical aperatures having the form of closed plane curves.

Another feature of this invention is the provision of an optical mirror of the above featured type wherein the support cage includes a plurality of rib members connected between adjacent annular support elements and spaced from the mirror's support surface. While desirably improving the stability of the support cage, the spaced rib members do not affect the predetermined deformation patterns formed by the annular support elements.

Another feature of this invention is the provision of an optical mirror of the above feature type wherein the annular support elements comprise hollow concentric cylinders and the rib members comprise hollow cylinders having side wall portions engaging adjacent wall surfaces of the cylindrical support elements. The use of hollow cylinders substantially simplifies manufacture and assembly of the various interrelated components.

Another feature of this invention is the provision of an optical mirror of the above featured type including a plurality of mounting elements connected to the cage at discrete contact regions, the most closely adjacent of which form a plurality of annularly uniform, non-intersecting and substantially concentric geometric curves. With this type of mounting arrangement, the stresses exerted upon the support cage by the mounting members introduce symmetrical distortion thereof and a corresponding deflection of the reflective mirror surface. Thus, stresses produced on the mirror surface both by direct contact with the annular support elements and by composite distortion of the support cage itself are such as to form symmetrical concentric deformation patterns which qualitatively match the similar light diffraction patterns created by optical apertures having the form of closed plane curves.

Another feature of this invention is the provision of an optical mirror of the above featured type wherein the most closely adjacent contact regions lie on circles concentric with the optical axis of the reflective mirror surface. The circular, concentric mirror deformation pattern produced by this arrangement is specifically suited for use with optical systems utilizing circular optical apertures.

Another feature of this invention is the provision of an optical mirror of the above featured type wherein the mounting elements project through apertures in the support cage back plate and have cylindrical terminations attached to the inner surfaces of strategically located hollow cylindrical rib members. This arrangement produces excellent mirror stability with relatively simple and easily assembled components.

These and other objects and features of the present invention will become more apparent upon a perusal of the following specification taken in conjunction with the accompanying drawings wherein.

Figure 1:
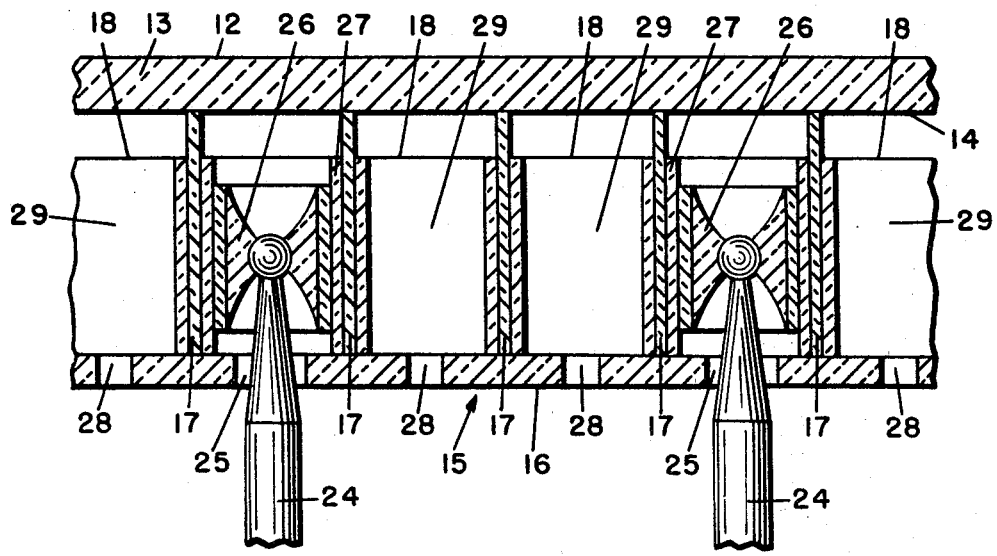
FIG. 1 is a partial cross-sectional view of a preferred embodiment of the invention.
Figure 2:
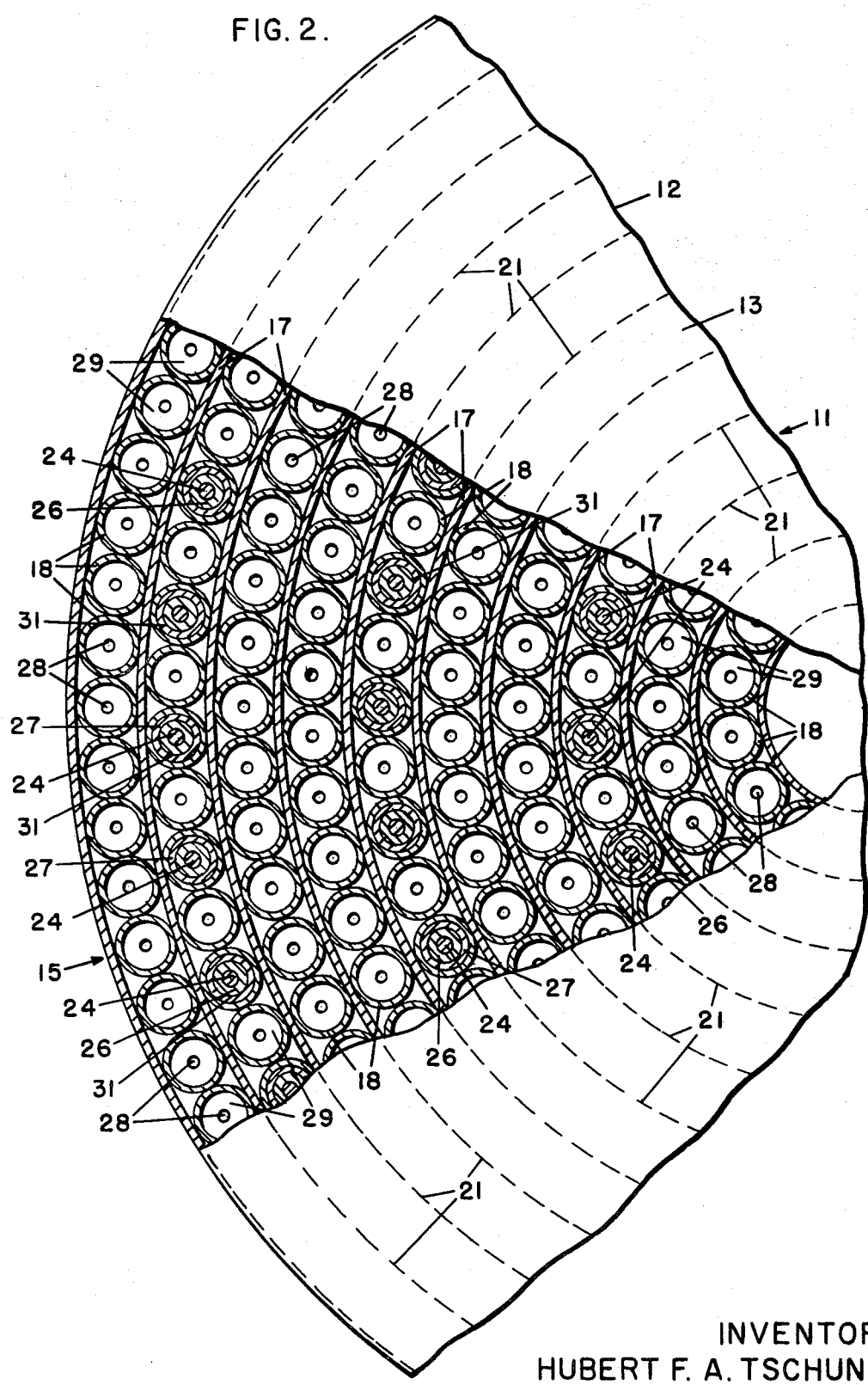
FIG. 2 is a partial plan view of the embodiment shown in FIG. 1 with a cut-away segment in cross-section.

Referring now to FIGS. 1 and 2, there is shown the mirror 11 including the front plate 12 having the outwardly disposed reflective mirror surface 13 and the oppositely directed support surface 14. Attached to the support surface 14 is the support cage 15 comprising the back plate 16 and the plurality of hollow cylindrical support elements 17. The support elements 17 are perpendicular to and join the spaced apart and parallel front and back plates 12 and 16. Structural stability is provided by the hollow cylindrical rib members 18 uniformly distributed between adjacent support elements 17 and having side wall portions attached thereto.

In a preferred embodiment of the invention, the front plate 12 and the various components comprising the support cage 15 all are formed from a common material having suitable optical properties such as quartz glass. The various pieces can then be fused at their joints to form the integral mirror structure 11. It will be appreciated that other well known materials also can be used or that individual parts of a given unit can be formed of dissimilar materials. However, in the latter case, materials having relatively low or substantially equal coefficients of thermal expansion would preferably be selected. In this way, the danger of destructive fracture due to thermal stress is minimized.

As shown in FIG. 2, the cylindrical support elements 17 engage the support surface 14 along continuous spaced apart contact paths 21 which are concentric with the optical axis 22 of the reflective surface 13. Furthermore, as shown in FIG. 1, the cylindrical rib members 18 are spaced from the support surface 14. Thus, all stresses exerted on the front plate 12 by the support cage 15 are applied along the contact paths 21. These stresses slightly deflect the reflective surface 12 forming deformations corresponding in position to the contact paths 21.

Figure 3:
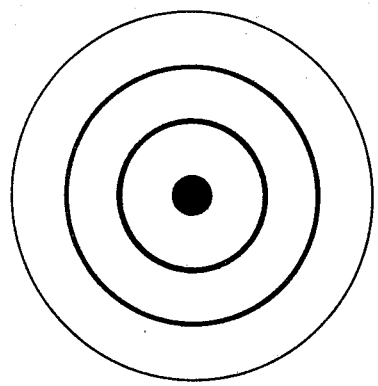
FIG. 3 is an illustration of a light diffraction pattern created by a circular optical aperture.

The circular concentric deformation pattern formed by the support cage 15 qualitatively matches the light diffraction pattern shown in FIG. 3. This is a typical diffraction pattern for a circular optical aperture. Because of the similarity between the reflective surface deformation and the aperture created diffracted light pattern, any image distortion produced by the reflective surface 13 is relatively harmless. Accordingly, an optical image of high quality can be obtained.

The optical mirror 11 is adapted for support by the mounting elements 24 shown in FIGS. 1 and 2. The apertures 25 in the back plate 16 accommodate the leg elements 24 which terminate with adjustable ball joint assemblies 26. Retaining the ball joint assemblies 26 are the hollow cylinders 27 having outer surfaces secured to inner surfaces of certain rib members 18. Additional orifices 28 in the back plate 16 prevent establishment of pressure differentials across the walls forming the annular chambers 29.

Because the support cage 15 is not an absolutely rigid structure, it will experience a certain amount of distortion subject to the forces applied by the mounting elements 24. This distortion can in turn produce reflective surface 13 deflections which do not correspond with the concentric, circular deformation pattern created by the contact paths 21. Naturally, such a result would introduce harmful image distortion in a concentric, circular diffraction pattern such as that shown in FIG. 3.

To prevent disruption of the desired mirror surface deformation pattern, the positions of contact between the mounting elements 24 and the support cage 15 are strategically chosen so as also to produce circular concentric deformation of the mirror surface 13. As shown in FIG. 2, the mounting elements 24 are so disposed that lines joining most closely adjacent regions of contact 31 between the mounting elements 24 and support cage 15 form geometric polygons and lie along circles concentric with the optical axis 22 of the mirror surface 13. Because of this arrangement, the forces applied by the mounting elements 24 induce distortion of the support cage 15 along circularly concentric paths corresponding to the concentric circles defined by the contact regions 28. Accordingly, the mounting elements 24 do not produce any reflective surface 13 deflection having a radial component which would introduce harmful distortion in a circularly concentric diffraction pattern of the type shown in FIG. 3.

Although the illustrated mirror structure is preferred for the many optical system which employ circular apertures, it will be appreciated that other mirror configurations can be used with other aperture types. For example, with elliptical apertures, elliptically shaped support elements could be substituted and the positions of the contact regions 31 modified so as to lie along a family of ellipses concentric with the optical aperture 22. Similarly, when using rectangularly shaped apertures, one could employ parallel to the mirror edges aligned support elements that would form a mirror surface deformation pattern comprising radially disposed deformations extending symmetrically from the optical axis 22. Such a deformation pattern would qualitatively match the diffraction pattern produced by a rectangular aperture. Similar deformation pattern matches could be produced for still other types of diffraction patterns.

Figure 4:
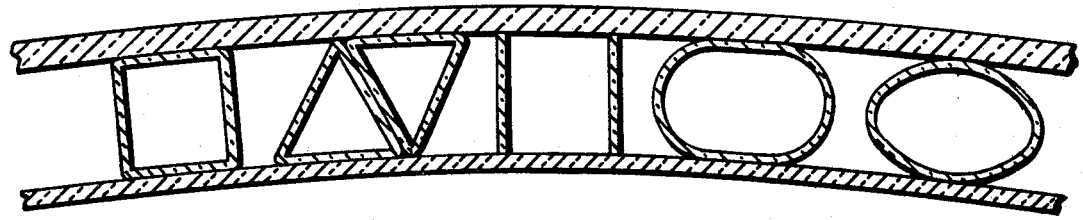
FIG. 4 is a schematic illustration of other rib configurations suitable for the mirror embodiment shown in FIGS. 1 and 2.

Obviously, many modifications and variations of the present invention are possible in light of the above teachings. For example, the circular cylindrical ribs 18 can be replaced by ribs of other geometrical types including those shown in FIG. 4. It is, therefore, to be understood that within the scope of the appended claims the invention can be practiced otherwise than as specifically described.

What is claimed is:

1. An optical mirror comprising a front plate having an outwardly disposed reflective surface adapted to receive and reflect light and a rear support surface, a mirror support cage comprising a back plate disposed adjacent said support surface and a plurality of concentric annular support elements connecting said support surface and said back plate, each of said plurality of support elements engaging said support surface along a continuous annular contact path, and wherein said contact paths form in projection a plurality of spaced apart, substantially concentric closed plane curves, a plurality of mounting elements connected to discrete contact regions of said support cage, and wherein said contact regions are so disposed that lines joining most closely adjacent contact regions form a plurality of annularly uniform, non-intersecting and substantially concentric geometric curves, said closed plane curves and said geometric curves being concentric with the optical axis of said reflective surface, said closed plane curves being circular and said most closely adjacent contact regions lying on circles concentric with said optical axis, said support cage including a plurality of rib members connected between adjacent ones of said annular support elements and recessed from said support surface, said mounting elements projecting through apertures in said back plate and attached to said rib members.

2. An optical mirror according to claim 1 wherein said annular support elements comprise hollow concentric cylinders.

3. An optical mirror according to claim 2 wherein said rib members comprise hollow cylinders having side wall portions engaging adjacent wall surfaces of said hollow cylindrical support elements.

4. An optical mirror according to claim 3 wherein said mounting elements comprise cylindrical terminal portions which are accommodated by inner surfaces of said hollow cylindrical rib members.

5. An optical mirror according to claim 1 wherein said support cage includes a plurality of rib members connected between adjacent ones of said annular support elements and spaced from said support surface.

6. An optical mirror according to claim 5 wherein said closed plane curves are circular and concentric with the optical axis of said reflective surface.

7. An optical mirror according to claim 6 wherein said annular support elements comprise hollow concentric cylinders.

8. An optical mirror according to claim 7 wherein said rib members comprise hollow cylinders having side wall portions engaging adjacent wall surfaces of said hollow cylindrical support elements.

References Cited

UNITED STATES PATENTS

| 2,988,959 | 6/1961 | Pelkeg et al. | 350—310 |
| 3,063,343 | 11/1962 | Kaestner | 350—310 |
| 3,453,041 | 7/1969 | Rantsch | 350—310 |

FOREIGN PATENTS

| 309,236 | 4/1929 | Great Britian. |
| 968,025 | 8/1964 | Great Britian. |

DAVID SCHONBERG, Primary Examiner

M. J. TOKAR, Assistant Examiner